United States Patent
Dicker et al.

(10) Patent No.: US 6,651,207 B1
(45) Date of Patent: Nov. 18, 2003

(54) METHOD AND SYSTEM FOR IMPROVING VOICE QUALITY IN CORDLESS COMMUNICATIONS

(75) Inventors: Olaf Dicker, Austin, TX (US); Uwe Sydon, Round Rock, TX (US); Juergen Kockmann, Austin, TX (US); Paulus Sastrodjojo, Round Rock, TX (US)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 0 days.

(21) Appl. No.: 09/378,189

(22) Filed: Aug. 20, 1999

(51) Int. Cl.[7] .................... G06F 11/00; G06F 11/30; G08C 25/00; H03M 13/00; H04L 1/00
(52) U.S. Cl. .................... 714/746; 714/704; 375/132
(58) Field of Search .................... 714/704, 746; 375/132, 227

(56) References Cited

U.S. PATENT DOCUMENTS

| | | | | |
|---|---|---|---|---|
| 4,328,581 A | * | 5/1982 | Harmon et al. | 714/708 |
| 5,204,855 A | * | 4/1993 | Bebee et al. | 370/436 |
| 5,204,856 A | * | 4/1993 | Bebee et al. | 370/436 |
| 5,323,447 A | | 6/1994 | Gillis et al. | 379/61 |
| 5,506,863 A | * | 4/1996 | Meidan et al. | 375/134 |
| 5,541,954 A | * | 7/1996 | Emi | 375/133 |
| 5,563,918 A | * | 10/1996 | Waldschmidt et al. | 375/347 |
| 5,640,415 A | * | 6/1997 | Pandula | 375/133 |
| 6,115,407 A | * | 9/2000 | Gendel et al. | 375/132 |
| 6,130,885 A | * | 10/2000 | Izumi et al. | 370/343 |
| 6,141,388 A | * | 10/2000 | Servais et al. | 375/262 |
| 6,240,126 B1 | * | 5/2001 | Ohashi et al. | 375/132 |

FOREIGN PATENT DOCUMENTS

| | | |
|---|---|---|
| DE | 4236 088 A1 | 4/1994 |
| DE | 4427 351 C1 | 3/1996 |
| GB | 2 340 695 A | 2/2000 |

OTHER PUBLICATIONS

PCT Search Report dated Nov. 8, 2000.

* cited by examiner

Primary Examiner—Albert Decady
Assistant Examiner—Joseph D. Torres

(57) ABSTRACT

The present invention comprises a system and method for improving voice quality of cordless communications. The system comprises at least one mobile unit having circuitry for maintaining an individual communication link with a base station. The system also has logic residing in the base station for selecting a frequency to maintain the communication link, monitoring parameters relating to the quality of the frequency, and performing data correction on the frequency in response to the monitored quality of the frequency.

32 Claims, 2 Drawing Sheets

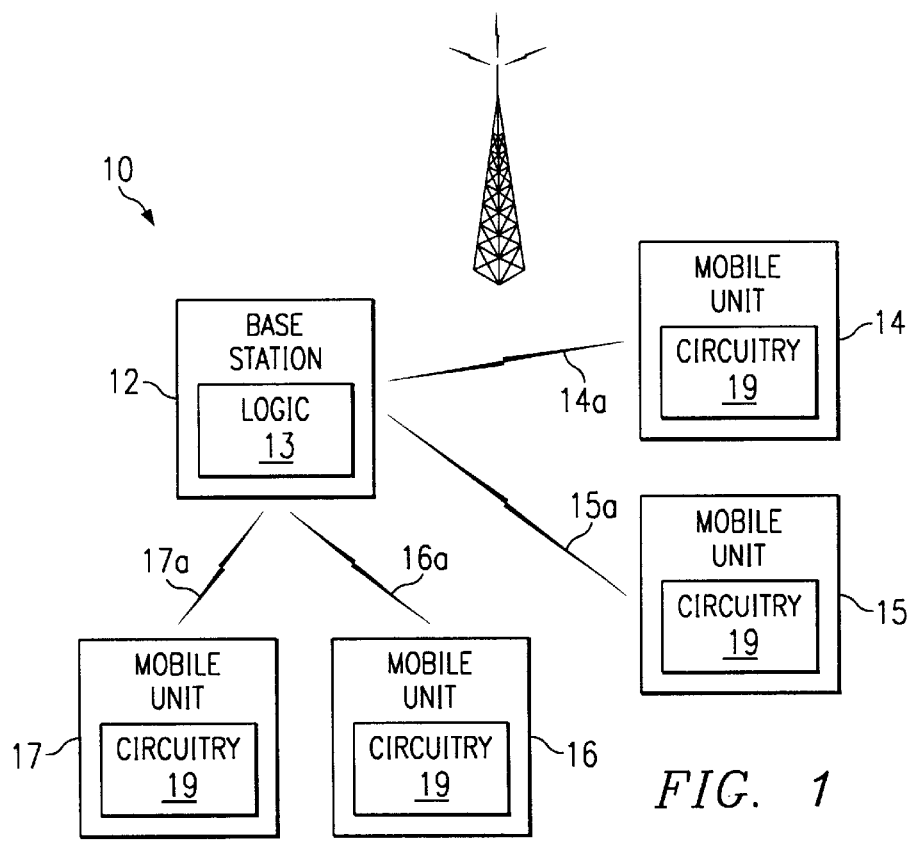
FIG. 1
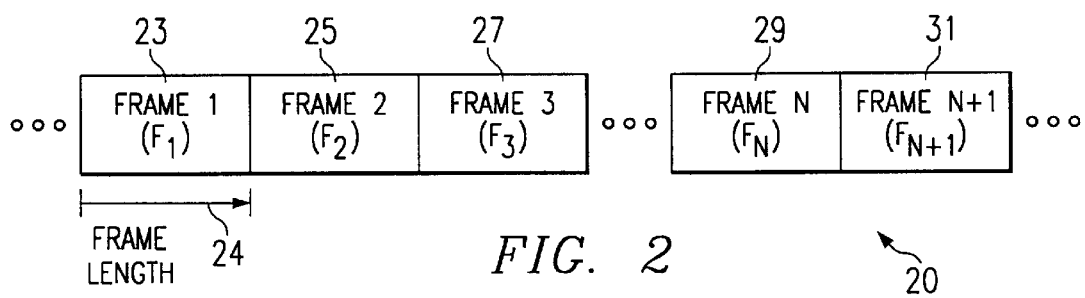
FIG. 2
| SUBSET    | 0    | 1    | 2    | 3   | 4   | 5   | 6   | 7   | 8   | 9   | 10  | 11   |   | 30 |
|-----------|------|------|------|-----|-----|-----|-----|-----|-----|-----|-----|------|---|----|
| CHANNEL   | 0...7| 0...7| 0...7|0...7|0...7|0...7|0...7|0...7|0...7|0...7|0...7|0...7 |   | 32 |
| FREQUENCY | 0...7|8...15|16...|     |     |     |     |     |     |     |     |...95 |   | 34 |
2.4 GHz           2.4835 GHz
FIG. 3

METHOD AND SYSTEM FOR IMPROVING VOICE QUALITY IN CORDLESS COMMUNICATIONS

TECHNICAL FIELD OF THE INVENTION

This invention relates generally to telecommunications and more particularly to a method and system for improving voice quality in cordless communications.

BACKGROUND OF THE INVENTION

In conventional cordless voice communication systems there is generally a single base station supporting a plurality of mobile units or hand sets. The base station in such systems acts as the master with all of the mobile units acting as slaves. The master base station controls and establishes the communication links with each of the mobile units. A function of the base station master controller is to detect errors over the communication links with the mobile units.

It is known to improve the voice quality over the communication link between the base station and the mobile units by using predictive methods to suppress distorted data packets. The choice of method generally depends on the speed at which errors over the communication links can be detected. In cordless systems where the same carrier is used, the data packets from transmission to transmission are correlated. Thus, if the quality of a first transmission is poor, it is highly likely that the next transmission will be poor. The quality of the data packets for the next transmission can thus be predicted from the data packets from the first transmission, and the base station can suitably and prospectively suppress distorted data packets.

In systems such as frequency hopping systems, which utilize various carriers over each communication link and change these carriers from time to time, a problem arises when a communication link encounters interference problems affecting the quality of the communication link with the base station controller. In these circumstances, the data packets from transmission to transmission are not correlated. Thus, if the quality of a first transmission is poor, it is not necessarily likely that the next transmission will be poor. The quality of the data packets for the next transmission can not be predicted from the data packets from the first transmission. Furthermore, there is no means to derive from the first transmission the necessary parameters required to perform packet suppression for the second transmission. This problem frustrates users and has been a long standing challenge to the developers of cordless communication devices.

Therefore, a need has arisen for a new method and system for improving voice quality in cordless communications that overcomes the disadvantages and deficiencies of the prior art.

SUMMARY OF THE INVENTION

In accordance with the present invention, a method and system for cordless communications is disclosed that provides for improving voice quality for frequencies used on individual communication links between a base station and its mobile unit. In one embodiment of the present invention, a method is disclosed for improving voice quality in cordless communications comprising three steps. In step one, a unique carrier frequency is selected to activate an individual communication link. The communication link is operable to transmit data to at least one mobile unit and a base station. In step two, the quality of the selected frequency is monitored. In step three, data correction is performed on the selected frequency if the monitored quality is unacceptable. In another embodiment of the present invention, a system for improving voice quality and cordless communications is disclosed. The system comprises at least one mobile unit having circuitry residing therein for maintaining an individual communication link with a base station. The system also comprises logic residing in the base station for selecting a frequency to maintain the communication link, monitoring parameters relating to the quality of the frequency, and performing data correction on the frequency in response to the monitor quality of the frequency.

A technical advantage of the present invention is the ability to automatically monitor the quality of the frequency used on an individual communication link between the base station and at least one mobile unit. The base station may then perform data correction on the frequency in response to the monitored quality of the frequency.

Other technical advantages should be apparent to one of ordinary skill in the art in view of the specification, drawings, and claims.

BRIEF DESCRIPTION OF THE DRAWINGS

For a more complete understanding of the present invention, the objects and advantages thereof, reference is now made to the following description taken in connection with the accompanying drawings in which:

FIG. 1 is a block diagram of one embodiment of a cordless communication system in accordance with the present invention.

FIG. 2 is a block diagram of one embodiment of frame frequencies used in a frequency hopping mobile communication system in accordance with the present invention.

FIG. 3 is a diagram of one embodiment of subdividing a band used in a frequency hopping mobile communication system in accordance with the present invention.

DETAILED DESCRIPTION OF THE DRAWINGS

Figure 4:
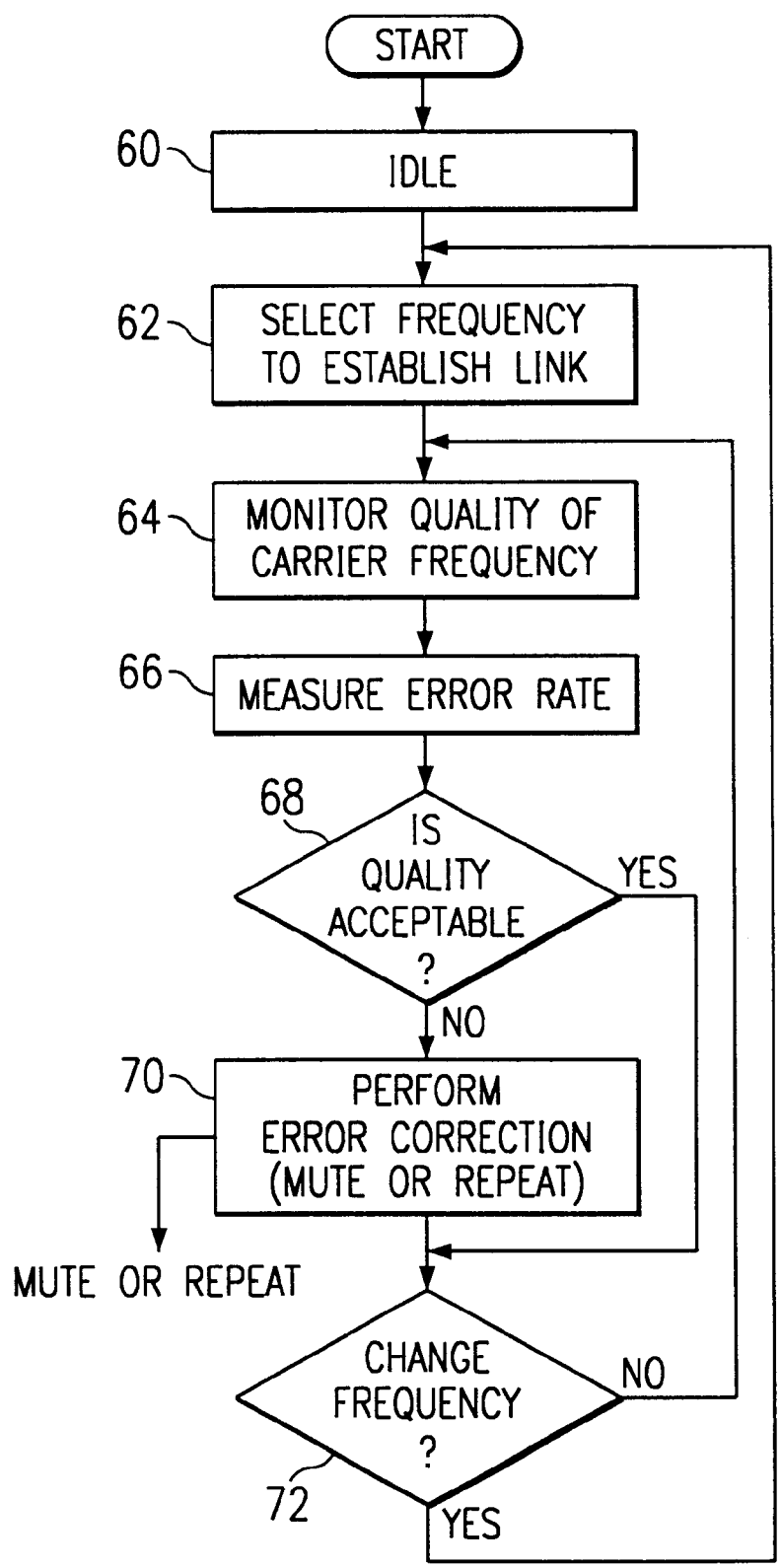
FIG. 4 is a flowchart for a method for cordless communications utilizing the teachings of the present invention.

The preferred embodiment of the present invention and its advantages are best understood by referring to FIGS. 1 through 4 of the drawings, like numerals being used for like and corresponding parts of the various drawings.

FIG. 1 is a block diagram of one embodiment of mobile or cordless communication system 10. System 10 comprises a base station 12, and a plurality of mobile units or handsets 14–17. While four mobile units have been shown for illustrative purposes, it should be understood by those skilled in the art that as few as one mobile unit may be used, or additional mobile units can be added without departing from the spirit of the invention. Each of the plurality of mobile units 14 may be coupled to base station 12 via a corresponding individual communication link 14a–7a to support communication using radio frequencies.

Base station 12 can communicate with mobile units 14–17 using a time division multiplexed (TDM) frame-based communication protocol. For example, each frame can be ten milliseconds (10 ms) in duration and can include transmit and receive channels for communication and control data. There are, of course, other protocols used for communicating between base station 12 and mobile units 14–17. For example, one protocol can be modified to support up to four mobile units in active communication with base station 12, each with enhanced communication features due to higher data rates. As another example, a limited number of additional mobile units 14 and 15 may be in active communication with each other but remain in contact with and in sync with base station 12 where each mobile unit utilizes two individual communication links (e.g., 14a, 14b, 15a, and 15b). It is also within the scope of the invention for system 10 to utilize a base station 12 with a capacity that supports active communication with an additional number of mobile units, or a system with more than one base station 12.

The plurality of mobile units 14–17 can be physically located anywhere within the communication capacity of base station 12, which is generally in a fixed location. Thus, each of the plurality of mobile units 14–17 is subject to atmospheric or other environment conditions that may affect the quality of the corresponding communication links 14a–17a. FIG. 1 illustrates that link 14a to mobile unit 14 may be encountering interference from a nearby microwave tower that is broadcasting on a similar radio frequency. On the other hand, mobile unit 16 may be located at the maximum distance within the range of base station 12. Thus, communication link 16a between base station 12 and mobile unit 16 may be degraded in quality by the weak radio signal strength on link 16a. Base station 12 is operable to communicate with mobile units 14–17 using radio frequencies, many methods for which are known to those skilled in the art. One such method utilizes spread spectrum technology. One example of such technology includes frequency hopping spread spectrum communications.

Within system 10, a frequency hopping scheme can address a number of implementation problems by accomplishing dynamic frequency selection. As one example, frequency hopping is useful in bands such as the ISM (Industrial, Scientific and Medical) band. One advantage of the ISM band is that it is unlicensed, and does not require a license fee for use. Thus, it is used by many vendors for various types of mobile or cordless devices (e.g., medial monitoring devices, wireless LANs, printers, speakers, security systems and in-building mobile communication systems). Consequently, radio frequency interference can be a significant problem when using this band. Use of such ISM-based devices is regulated by and must follow Federal Communications Commission (FCC) guidelines in the United States. For example, devices are allowed to communicate at a particular frequency only with a defined bandwidth for a defined period of time and within a defined signal power level. In the embodiment of FIG. 1, system 10 can use the ISM band extending from 2.4 GHz to 2.4835 GHz for supporting communication between base station 12 and mobile units 14–17. However, in order to operate within FCC or other government regulations, system 10 implements a frequency hopping scheme. This allows system 10 to support robust cordless communications in the ISM band while operating within regulation guidelines.

Under the frequency hopping scheme, base station 12 and mobile units 14–17 generally move in sync in the time domain from frequency to frequency. Mobile units 14–17 are initially not in active communication with base station 12 when entering an area serviced by base station 12. Mobile units 14–17 can then "listen" at a specific radio frequency to attempt to lock on to base station 12. When base station 12 hops to that specific frequency, mobile units 14–17 can identify and receive control data transmitted by base station 12. This allows mobile units 14–17 to lock with base station 12 and sync with the frequency hopping scheme. By implementing such a frequency hopping scheme, system 10 may avoid bad channels or frequencies due to radio frequency interference and other problems. Details illustrating such a frequency hopping scheme are discussed in further detail in conjunction with FIGS. 2 and 3.

Improving voice quality in a system that uses such a frequency hopping scheme presents a challenging problem because system algorithms ensure that the contents of consecutive data packets are not correlated. Thus, the quality of a prior data packet may not be used to predict the quality of a successive data packet, as is done with non-spread spectrum systems.

To improve the voice quality over each communication link 14a–17a between base station 12 and each of the plurality of mobile units 14–17, base station 12 has logic 13 operable to select a frequency to establish a link 14a between base station 12 and a mobile unit 14. Logic 13 also monitors the quality of the frequency used on link 14a. Such monitoring may include measuring parameters that indicate that signal bursts or parts of signal bursts are lost or corrupted over the communication link, or the strength of the signal over the communication link. Other parameters are known to those skilled in the art. Logic 13 may then identify or mark a frequency as bad if such parameters indicate an unacceptable quality for that frequency. The next time the marked frequency is to be used in the frequency hopping scheme, logic 13 corrects the error while communicating to the mobile unit using the marked frequency. For example, base station 12 may mute the data, or communicate to the mobile unit that it should utilize the prior data packet. Other such methods for correcting errors in voice data are known to those skilled in the art. Logic 13 performs these functions for each of the communication links 14a–17a, for each mobile unit 14–17.

Each mobile unit 14–17 has circuitry 19 residing therein for establishing such communications with base station 12. Because base station 12 performs such evaluations on a frequency-by-frequency basis, each mobile unit 14–17 may thus actively communicate with base station 12 on the same or individual frequencies that minimize the loss of voice information over individual links 14a–17a associated with each mobile unit.

Such a scheme to improve voice quality can be used with any algorithm to prevent interference with multiple base stations in system 10. Thus, the scheme should be consistent across any multiple base stations, yet attempt to ensure that adjacent base stations do not select the same frequencies and interfere with one another. This means that the frequency selection process needs to be both predictable (so mobile units can lock with any base station) and variable (so base stations operate at different frequencies). The scheme may also avoid selecting frequencies yielding poor quality for individual communications links. Further, the scheme should react to interference by separating the frequencies selected by a base station from possible interference from other base stations.

FIG. 2 is a block diagram of one embodiment of frame frequencies for a frequency hopping mobile communications system. As shown, a frame structure 20 comprises a plurality of frames 22, 23, 25, ... 29, ... each having a frame length 24. Frame 23 follows immediately after the previous frame 22 in the time domain, and so on. In the embodiment of FIG. 2, a different frequency ($F_1, F_2, F_3 \ldots F_N, F_{N+1}, \ldots$) is associated with each frame 22, 23, ... and is used during that frame 22, 23, ... for communication on a communication link between base station 12 and a mobile unit such as mobile unit 14. This change from frequency to frequency is handled by a frequency hopping scheme implemented by base station 12 and mobile units 14–17. During the duration of a given frame 22, base station 12 and mobile units 14–17 communicate using the selected frequency for that frame 22. When the next frame 23 begins, base station 12 and mobile units 14–17 communicate using a new selected frequency. In one embodiment, frame length 24 is ten milliseconds, thus the frequency being used changes every ten milliseconds.

Cordless communication system 10 improves the voice quality in communications transmitted over each frequency utilized over communication links 14a–17a. Thus, base station 12 may communicate with each mobile unit utilizing the same frequency $F_1$ during a given frame 22, and then use a different frequency $F_2$ for successive frame 23. Base station 12 may also communicate with each mobile unit 14–17 utilizing a different frequency within a given frame 22. For example, base station 12 may communicate during frame 22 with mobile unit 14 using frequency $F_1$, with mobile unit 15 utilizing frequency $F_2$, etc., utilizing a time division multiplexed frequency hopping scheme. Thus, base station 12 may communicate with each mobile unit 14–17 utilizing either the same or a different frequency during a given frame.

FIG. 3 is a diagram of one embodiment of subdividing the ISM band for a frequency hopping mobile communications system. The ISM band used in this embodiment extends from 2.4 GHz to 2.4835 GHz. As mentioned, the FCC defines requirements for use of frequencies within the ISM band. For example, within a 30 second period, the regulations limit the maximum length of time that a system can use one frequency to 0.4 seconds. Thus, the total available frequencies needs to include seventy-five or more frequencies. In the embodiment of FIG. 3, this range is divided into twelve subsets 30, and each subset 30 is divided into eight channels 32. Each channel 32 is then associated with one of ninety-six frequencies 34 defined within and equally subdividing the ISM band. Frequencies 34 then provide a set of frequencies from which the frequency hopping scheme can select for each frame 22.

The frequency hopping scheme, in addition to selecting frequencies, also may implement a scheme for optimizing the quality for communication links. For example, a PCS microwave tower may interfere with frequencies in the ISM band in a particular region. Thus, mobile communication system 10 would not want to use those frequencies in those links so affected. One such method to optimize the quality for an individual communication link is to avoid such bad frequency subsets by blocking their selection from that link. By dividing the ISM band into ninety-six frequencies, the embodiment of FIG. 3 provides sufficient frequencies to allow bad frequencies to be blocked while keeping the number of available frequencies above the seventy-five frequency threshold. For example, there is freedom to avoid using the frequencies within two subsets 30 without dropping below the seventy-five frequency threshold.

FIG. 4 is a flowchart of one embodiment of a method for improving voice quality in cordless communications in accordance with the present invention. The method of FIG. 4 can be implemented by base station 12 to improve voice quality for each communication link 14a–17a between base station 12 and each mobile unit 14–17. In general, the method of FIG. 4 includes the steps of base station 12 selecting a frequency to establish a link, monitoring the quality of that frequency, determining whether the quality of the frequency is acceptable, and performing data correction if the quality of the frequency is not acceptable. Base station 12 performs the method shown in FIG. 4 for each of the mobile units in communication with base station 12 while each individual mobile unit has an established active link with base station 12.

The method of FIG. 4 comprises a number of steps, beginning at step 60. Base station 12 waits in an idle state to connect to a mobile unit such as mobile unit 14. At step 62, base station 12 selects a frequency to establish an individual communication link 14a with mobile unit 14. Base station 12 may utilize an operable radio frequency yielding good quality to communicate with mobile unit 14. When establishing an active communication link 14a between base station 12 and mobile unit 14, a range of such operable radio frequencies should be available for base station 12 to use. Thus, base station 12 may either use a default set of frequencies, or the last frequencies available for the prior active communication link with that mobile unit. As mentioned above with respect to FIG. 3, one embodiment of mobile communication system 10 defines twelve different subsets for grouping channels within the ISM band. One embodiment for the method of FIG. 4 operates to select for use the current best ten out of the twelve available subsets, and to block the remaining two subsets because those subsets represent poor quality for that communication link. Thus, in this embodiment, system 10 may establish the link with the last available ten subsets. In another embodiment, system 10 may establish the link using the last available carrier frequency.

In general, the method of FIG. 4 also includes step 64 for monitoring the quality of the frequency used on the individual communication link between base station 12 and that mobile unit. In one embodiment, base station 12 measures error rates over the communication link at step 66. Such errors may include a bit-error rate. Such error rates typically reveal whether the communication link is encountering interference. As another example, in one embodiment of system 10, such parameters include two error rates associated with each subset. These error rates reflect conditions encountered on the communication link such as (a) bad packet data, indicated by a bad synchronization word or (b) bad cyclic redundancy code (CRC). The first error rate used in this embodiment is measured over a short period of time, whereas the second error rate is measured over a longer period of time. Consequently, the first error rate can be referred to as the short-term error rate, and the second error rate can be referred to as the long-term error rate. Another parameter that may be measured in step 66 represents the radio signal strength received over the individual communication link from that mobile unit. It is also within the scope of the invention for system 10 to measure other parameters that may assist in determining the quality of the frequency used on the communication link between base station 12 and that mobile unit.

Base station 12 determines whether the quality of the frequency is acceptable in step 68. In one embodiment of the invention, such a determination may be made by comparing the bit-error rate measured in step 66 to a predetermined threshold. In another embodiment, such a threshold may be dynamically determined, allowing for system 10 to adapt to changing interference.

After such a determination has been made in step 68, the method of FIG. 4 includes step 70 for performing data correction. In this embodiment, such data correction includes marking the frequency as bad. System 10 then suppresses any data packets that are to be next transmitted utilizing the bad frequency. In one embodiment, base station 12 may mute the data packet to be transmitted to the mobile unit associated with the communication link for which the bad frequency is selected. In another embodiment, system 10 repeats the contents of the data packet last transmitted to that mobile unit, instead of using the data packet transmitted over the bad frequency. Alternatively, base station 12 may communicate to the mobile unit that it should ignore the contents of the data packet received over the bad frequency, and instead utilize the contents of the last data packet received. Other methods for suppressing distorted data packets are known to those skilled in the art. One such method includes burst error concealment, which typically low-pass filters and repeats the data of the last burst. The repeated data may also be faded in volume.

The method of FIG. 4 also includes system 10 determining whether to change the frequency to use on that communication link at step 72. In one embodiment, step 72 may comprise a frequency hopping scheme as discussed in further detail in conjunction with FIGS. 2 and 3. Such a frequency hopping scheme may be dynamically determined, or follow a predetermined pattern. If so, system 10 returns to step 62 to select a new frequency. If not, system 10 returns to step 64 to continue to monitor the quality of the frequency.

Thus, after steps 62–72 have been performed over a number of frames 22, it is likely that system 10 has determined and marked as bad frequency $F_1$ during a previous frame 22, at steps 68 and 70. System 10 may have employed many frequencies over communication links 14a–17a utilizing a frequency hopping scheme after this number of frames 22. Frequency $F_1$ may then be selected via the frequency hopping scheme for a subsequent frame 22. System 10 then performs error correction for bad frequency $F_1$ by suppressing the distorted data packets as described above in conjunction with step 70.

Such selecting and monitoring as used in the method of FIG. 4 may be accomplished in a variety of ways known to those skilled in the art. For example, frequencies may be selected or calculated from a table. Further, parameters calculated by base station 12, such as the bad frequency, may be communicated to the mobile unit as data or control parameters. They may also be encoded or passed to the mobile unit as tabular data. Base station 12 then may wait until the mobile unit is ready to utilize these parameters if it is necessary in an embodiment where seamlessness is required to avoid the loss of synchronization between base station 12 and the mobile unit.

Steps 60–72 in FIG. 5 are performed for each mobile unit for each frequency used on each communication link, in system 10. At any time, a mobile unit may disconnect from base station 12. At this point, base station 12 then waits to connect to that mobile unit at step 60, but continues the steps of selecting, monitoring, and performing error correction for each of the other mobile units in system 10 that is actively communicating with base station 12. It is also within the scope of the invention for base station 12 to select and monitor the frequencies used on each of the communication links between the base station and the mobile units at predetermined intervals, or adaptively.

The flowchart of FIG. 4 illustrates one embodiment of a method for mobile communications. Such a method may be implemented in a variety of technologies known to those skilled in the art. For example, various algorithms may be implemented in software firmware or hardware. As another example, methods for monitoring the quality of a frequency used on an individual communication link between the base station and a mobile unit and/or determining whether the quality of that frequency is acceptable may be implemented in a table. Furthermore, such algorithms may be changed dynamically to varying conditions encountered by system 10. In this way, system 10 can adaptively improve voice quality for frequencies used on individual communication links within system 10.

Base station 12 is also operable to communicate with mobile units 14 through 17 using the digital enhanced cordless telecommunications (DECT) protocol, which is the Pan-European standard for digital cordless systems. Such systems do not use spread spectrum technology, and thus use the same carrier frequency for any communication link between base station 12 and a mobile unit. In such systems, base station 12 may perform error correction according to the teachings of the present invention. Such error correction may also include such systems selecting a new carrier frequency for operation.

While the invention has been particularly shown and described by the foregoing detailed description, it will be understood by those skilled in the art that various other changes in form and detail may be made without departing from the spirit and scope of the invention.

What is claimed is:

1. A system for improving voice quality in cordless communications, comprising:
   a) at least one mobile unit operable to transmit and receive data at a plurality of frequencies over a communication link; and
   b) a base station operable to transmit and receive data over the communication link, the base station comprising logic operable to:
      select a frequency from the plurality of frequencies to transmit and receive data over the communication link,
      monitor during a first time period at least one parameter relating to the quality of the selected frequency,
      select, after the first time period, another frequency from the plurality of frequencies to transmit and receive data over the communication link;
      select, during a second time period subsequent to a selection of the another frequency, the frequency that was monitored during the first time period; and
      perform, during the second time period, at least one error correction on the frequency in response to the monitored frequency quality monitored during the first time period.

2. The system of claim 1, wherein the one mobile unit comprises a plurality of mobile units and the base station responsive to the plurality of mobile units.

3. The system of claim 2, wherein the base station is operable to select a plurality of unique frequencies, each of the selected frequencies to be used for one individual communication link.

4. The system of claim 1, wherein the at least one parameter represents whether an error rate measured over the individual communication link is acceptable.

5. The system of claim 1, wherein selecting the frequency is performed according to a frequency hopping scheme.

6. The system of claim 1, wherein performing error correction comprises:
   (a) marking the selected frequency on the individual communication link as bad if the quality over the individual communication link is unacceptable; and
   (b) muting contents of a next transmission to be sent over the individual communication link using the bad frequency.

7. The system of claim 1, wherein performing error correction comprises:

(a) marking the selected frequency as bad if a bit-error rate measured over the individual communication link is unacceptable; and (b) retransmitting contents of a last transmission that was last sent over the individual communication link.

8. The system of claim 1, wherein performing error correction comprises at least one of suppressing data to be transmitted during the second time period using the selected frequency, retransmitting data during the second time period from a previous transmission, instructing the mobile unit during the second time period to ignore the data previously transmitted over the selected frequency, and instructing the mobile unit during the second time period to utilize data from a previous transmission.

9. The system of claim 1, wherein the logic is further operable to block future selection of the first frequency.

10. The system of claim 1, wherein:

the selected frequency comprises one of a plurality of frequencies in a frequency subset; and the logic is further operable to block future selection of all frequencies in the frequency subset.

11. A method for improving voice quality in cordless communications, comprising:

selecting a unique carrier frequency over an individual communication link, the communication link operable to carry data between at least one mobile unit and a base station;

monitoring the quality of the selected frequency during a first time period;

selecting another frequency after the first time period to transmit and receive data over the communication link;

after selecting the another frequency, selecting, during a second time period, the frequency that was monitored during the first time period; and performing, during the second time period, error correction on the selected frequency in response to the monitored quality monitored during the first time period.

12. The method of claim 11, wherein the selecting step comprises a frequency hopping scheme.

13. The method of claim 11, wherein the monitoring step comprises determining a bit-error rate.

14. The method of claim 11, wherein the monitoring step comprises determining whether the selected frequency is encountering interference.

15. The method of claim 11, further comprising:

(a) selecting an additional plurality of unique carrier frequencies, one of the frequencies to be used to activate each individual communication link;

(b) monitoring the quality of the additional selected frequencies; and (c) performing data correction on the additional selected frequencies if the monitored quality is unacceptable.

16. The method of claim 11, further comprising selecting the unique carrier frequency to activate a plurality of individual communication links, each of the communication links operable to transmit data to one of a plurality of mobile units and a base station.

17. The method of claim 11, wherein the performing error correction step comprises:

(a) marking the selected frequency on the individual communication link as bad if the quality over the individual communication link is unacceptable; and (b) muting contents of a next transmission to be sent over the individual communication link using the bad frequency.

18. The method of claim 11, wherein the performing error correction step comprises:

(a) marking the selected frequency on the individual communication link as bad if the quality on the selected frequency is unacceptable; and (b) retransmitting contents of a last transmission that was last sent over the individual communication link.

19. The method of claim 11, wherein performing error correction comprises at least one of suppressing data to be transmitted during the second time period using the selected frequency, retransmitting data during the second time period from a previous transmission, instructing the mobile unit during the second time period to ignore the data previously transmitted over the selected frequency, and instructing the mobile unit during the second time period to utilize data from a previous transmission.

20. The method of claim 11, further comprising blocking future selection of the unique carrier frequency.

21. The method of claim 11, wherein the selected frequency comprises one of a plurality of frequencies in a frequency subset; and further comprising blocking future selection of all frequencies in the frequency subset.

22. A method for improving voice quality in cordless communications, comprising:

providing a base station and at least one mobile unit;

sending data using a selected frequency over an individual communication link between the base station and the mobile unit during a first time period, the communication link associated with the mobile unit;

evaluating, during the first time period, the selected frequency used on the associated communication link to determine the transmission quality of the selected frequency;

after the first time period, sending data using another selected frequency over the individual communication link;

after sending data using the another selected frequency, sending data during a second time period using the selected frequency that was used during the first time period;

performing, during the second time period, error correction on the selected frequency if the transmission quality was evaluated as unacceptable during the first time period; and repeating the process for a second mobile unit.

23. The method of claim 22, wherein the selected frequency comprises a frequency obtained using a frequency hopping scheme.

24. The method of claim 22, wherein the repeating step comprises:

(a) sending data using a second frequency over the communication link associated with the second mobile unit for a third time period;

(b) evaluating the second frequency used on the associated communication link to determine the transmission quality of the second frequency; and (c) performing error correction on the second frequency if the transmission quality is unacceptable when the second frequency is used during a fourth time period.

25. The method of claim 22, wherein the evaluating step comprises evaluating whether any signal source is interfering with the selected frequency.

26. The method of claim 22, wherein the performing step comprises:

(a) identifying the selected frequency as bad; and (b) suppressing a next transmission of data on the bad frequency.

27. The method of claim 22, wherein performing error correction comprises at least one of suppressing data to be transmitted during the second time period using the selected frequency, retransmitting data during the second time period from a previous transmission, instructing the mobile unit during the second time period to ignore the data previously transmitted over the selected frequency, and instructing the mobile unit during the second time period to utilize data from a previous transmission.

28. The method of claim 22, further comprising blocking future use of the selected frequency.

29. The method of claim 22, wherein the selected frequency comprises one of a plurality of frequencies in a frequency subset; and further comprising blocking future selection of all frequencies in the frequency subset.

30. A system for improving voice quality in a cordless communications system comprising a base station, the base station operable to:

select a first frequency for a first time period;

communicate with at least one mobile unit using the first frequency;

monitor, during the first time period, at least one parameter related to the quality of the first frequency;

select at least one second frequency after using the first frequency;

communicate with the at least one mobile unit using the at least one second frequency;

select the first frequency again for a second time period; and perform at least one error correction based on the at least one parameter monitored during the first time period, the at least one error correction performed during the second time period and while communicating with the at least one mobile unit using the first frequency.

31. A method for improving voice quality in cordless communications, comprising:

selecting a first frequency for a first time period;

communicating with at least one mobile unit using the first frequency;

monitoring, during the first time period, at least one parameter related to the quality of the first frequency;

selecting at least one second frequency;

communicating with the at least one mobile unit using the at least one second frequency;

after communicating using the at least one second frequency, selecting the first frequency again for a second time period; and performing at least one error correction on the first frequency during the second time period while communicating with the at least one mobile unit using the first frequency, the at least one error correction selected based on the monitoring of the at least one parameter monitored during the first time period.

32. An apparatus, comprising:

software encoded on at least one computer-readable medium and operable when executed to:

select a first frequency for a first time period;

communicate with at least one mobile unit using the first frequency;

monitor, during the first time period, at least one parameter related to the quality of the first frequency;

select at least one second frequency after selecting the first frequency;

communicate with the at least one mobile unit using the at least one second frequency;

select, after the selection of the at least one second frequency, the first frequency again for a second time period; and perform, during the second time period, at least one error correction while communicating with the at least one mobile unit using the first frequency, the at least one error correction selected based on the monitoring of the at least one parameter monitored during the first time period.

* * * * *